United States Patent
Edmonds et al.

(10) Patent No.: US 10,198,273 B2
(45) Date of Patent: Feb. 5, 2019

(54) DOCKING SYSTEM

(71) Applicants: Timothy Mark Edmonds, Castelnau-le-Lez (FR); Richard Akester, Cambridge (GB)

(72) Inventors: Timothy Mark Edmonds, Castelnau-le-Lez (FR); Richard Akester, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 15/541,688

(22) PCT Filed: Jan. 4, 2016

(86) PCT No.: PCT/GB2016/050003
§ 371 (c)(1),
(2) Date: Jul. 5, 2017

(87) PCT Pub. No.: WO2016/110679
PCT Pub. Date: Jul. 14, 2016

(65) Prior Publication Data
US 2018/0004540 A1    Jan. 4, 2018

(30) Foreign Application Priority Data
Jan. 5, 2015    (GB) .................... 1500055.7

(51) Int. Cl.
*G06F 9/4401* (2018.01)
*H04W 84/20* (2009.01)
(Continued)

(52) U.S. Cl.
CPC .......... *G06F 9/4411* (2013.01); *G06F 13/385* (2013.01); *G06F 13/4286* (2013.01);
(Continued)

(58) Field of Classification Search
CPC ............. G06F 9/44505; G06F 9/45558; G06F 13/385; G06F 13/4068; G06F 13/4221
(Continued)

(56) References Cited

U.S. PATENT DOCUMENTS 7,164,887 B2 *    1/2007    Tanada ................. H04W 84/20
                                                    455/41.2
7,757,177 B1 *    7/2010    Bohm .................. G06F 17/243
                                                    715/221
(Continued)

FOREIGN PATENT DOCUMENTS

JP        200210116 A      4/2002
WO     2005/114413 A1    12/2005
(Continued)

OTHER PUBLICATIONS

Machine Translation of WO2014065414A1 (Year: 2012).*
(Continued)

*Primary Examiner* — Paul R. Myers
(74) *Attorney, Agent, or Firm* — Fisherbroyles, LLP; Robert Kinberg (57) ABSTRACT

A method of determining which of at least two connected mobile devices is to function as a host device, wherein the mobile devices first determine which of them is to act as an initial host device and which is to act as an initial peripheral device. The initial host device then receives instructions from a user as to which of the mobile devices is to be the host device. If the instructions indicate that the initial host device is to be the host device, the initial host device controls, as host device, the initial peripheral device as a peripheral device, and if the instructions indicate that the initial peripheral device is to be the host device, the initial host device passes control to the initial peripheral device to enable the initial peripheral device to control, as host device, the initial host device as a peripheral device.

33 Claims, 5 Drawing Sheets

(51) Int. Cl.
    *H04W 76/14*     (2018.01)
    *G06F 13/38*     (2006.01)
    *G06F 13/42*     (2006.01)
    *H04M 1/725*     (2006.01)
    *H04W 52/02*     (2009.01)
    *H04W 72/04*     (2009.01)

(52) U.S. Cl.
    CPC ....... *H04M 1/7253* (2013.01); *H04W 52/027* (2013.01); *H04W 72/048* (2013.01); *H04W 76/14* (2018.02); *H04W 84/20* (2013.01); *Y02D 70/20* (2018.01)

(58) Field of Classification Search
    USPC .................................................. 710/308, 14
    See application file for complete search history.

(56) References Cited

U.S. PATENT DOCUMENTS

| | | | | |
|---|---|---|---|---|
| 8,959,170 | B2* | 2/2015 | Miyabayashi | H04W 84/20 709/209 |
| 9,462,109 | B1* | 10/2016 | Frazier Fields | H04M 1/6066 |
| 9,769,778 | B2* | 9/2017 | Daley | H04W 56/0015 |
| 2003/0124979 | A1* | 7/2003 | Tanada | H04W 84/20 455/41.1 |
| 2004/0097193 | A1* | 5/2004 | Nakatsuka | H04W 48/00 455/41.2 |
| 2004/0203373 | A1* | 10/2004 | Ogino | H04W 84/20 455/41.2 |
| 2004/0203936 | A1* | 10/2004 | Ogino | H04M 1/72513 455/463 |
| 2006/0095515 | A1* | 5/2006 | Forstadius | G06F 17/30905 709/205 |
| 2006/0194609 | A1* | 8/2006 | Matsuo | H04M 1/6066 455/552.1 |
| 2009/0006686 | A1 | 1/2009 | Kimura | |
| 2009/0240781 | A1* | 9/2009 | Otsuka | H04W 84/20 709/208 |
| 2009/0259720 | A1* | 10/2009 | Heins | G06Q 10/10 709/205 |
| 2010/0312919 | A1* | 12/2010 | Lee | G06F 9/54 710/14 |
| 2010/0317291 | A1* | 12/2010 | Richardson | H04W 74/0825 455/63.1 |
| 2011/0265187 | A1* | 10/2011 | Li | G06F 21/6263 726/27 |
| 2014/0044133 | A1* | 2/2014 | Wang | H04J 3/0697 370/395.62 |
| 2014/0207442 | A1* | 7/2014 | Ganong, III | H04W 12/02 704/201 |
| 2015/0126121 | A1* | 5/2015 | Noh | H04W 76/023 455/41.2 |
| 2015/0230047 | A1 | 8/2015 | Nishimura et al. | |
| 2015/0245278 | A1* | 8/2015 | Scahill | H04W 12/08 370/329 |

FOREIGN PATENT DOCUMENTS

WO      2007/122453 A1      11/2007
WO      2014/065414 A1      5/2014

OTHER PUBLICATIONS

International Search Report for PCT/GB2016/050003, dated May 31, 2016.
Written Opinion for PCT/GB2016/050003, dated May 31, 2016.
GB Search Report for GB Application No. 1500055.7, dated Jun. 30, 2015.

* cited by examiner

DOCKING SYSTEM

CROSS-REFERENCE TO RELATED APPLICATIONS

This application is a U.S. National Stage of International Patent Application No. PCT/GB2016/050003 filed Jan. 4, 2016, designating the United States and claiming benefit of GB Patent Application No. 1500055.7 filed Jan. 5, 2015.

BACKGROUND OF THE INVENTION

This invention relates to methods of connecting two or more devices to one another, and particularly to such methods that allow two or more devices, including mobile devices, to be able to share data and functionality in a customisable manner.

It is known to connect one device to another such that one of the devices (sometimes known as a "Host device") is able to control functionality such as a display, disk storage and the data stored on the disk, audio output and other resources, that are available on the other device (sometimes known as a "Peripheral device") such that the Peripheral device is under the control of the Host device in the same way as a mouse, display, keyboard etc. For example, a user might connect his or her smartphone to his or her laptop in order to charge the phone, upload photographs to the laptop, copy audio files to the phone and so on. In this situation the laptop is used as the Host device as it is using the smartphone as an external hard drive with a battery. The connection between the devices may be wired, using any general-purpose or use-specific wired method including USB, HDMI, Ethernet or any other appropriate method or may be wireless, using Bluetooth, Wi-Fi or any other appropriate wireless method or may be via any wired or wireless network connection, including the Internet.

When two devices are connected to one another there has generally been no way for the user to select which one should act as the Host device; this selection has been made automatically by the devices based on assumptions regarding the devices, so that, generally, the device most similar to a conventional desktop computer, is selected as the Host device, regardless of the resources available on the two devices in question. This may not be desirable. For example, a user may connect his or her laptop to his or her smartphone when the laptop has a very low battery level but the phone has a very high battery level. Nonetheless, the laptop and the smartphone will be connected with the laptop as the Host device and the smartphone as the Peripheral device and the laptop will attempt to charge the phone because that is the common standard default behaviour.

When two devices are connected, the Peripheral device is normally treated as having limited functionality. The Host device may use any internal display on the Peripheral device as an extended display and is may also access any internal hard drive, as mentioned above, but the Peripheral device's processing power is not normally used. This means that the Peripheral device's resources are not being used to their full potential.

The default settings for Host and Peripheral devices are also often set at a basic level in that there is no adjustment in behaviour for different resources: if one device is acting as the Host device it is acting as the Host device with regard to all functionality, whether or not this is desirable.

The Host device is able to access resources on the Peripheral device but there is usually no way for the Peripheral device to access resources on the Host device. To continue the example of the user who connects his or her laptop to his or her smartphone, all functionality is controlled from the laptop. Even if the smartphone's interface is still useable—it may only be showing an informative screen, for example—it will not be possible for the user to access any resources on the laptop from the smartphone. For example, he or she will not be able to browse the laptop's hard drive from the smartphone.

It is also the case that where two devices are connected to one another one will usually be treated as the Host device and the other as the Peripheral device. There is usually no way for the two devices to use one another's resources equally except under the limited circumstances of two computers connected via a network, which under some circumstances may be able to access one another's data. A connection in which devices are able to share resources is often known as a Peer-to-Peer connection.

Furthermore, there is also usually no way to limit access to a device's resources; if one device is connected to another, the Host device will be able to access the Peripheral device's functionality, such as hard disk storage, whether or not this is desirable for the user. For example, if a user lends his or her tablet computer to a friend to use as an extended display for a desktop computer, he or she may not want his or her friend to be able to access the hard disk of the tablet computer. However, with known systems, this would be the automatic normal behaviour of the system.

The present invention therefore seeks to overcome or at least ameliorate one or more of the above-mentioned problems.

SUMMARY OF THE INVENTION

Accordingly, in a first aspect of the invention, there is provided a method of determining which of at least two mobile devices is to function as a host device, the method comprising:

connecting two mobile devices for communication with each other;

the mobile devices communicating with each other to determine which of the mobile devices is to act as an initial host device and which is to act as an initial peripheral device;

the initial host device providing a user of the initial host device on a display of the initial host device with options to enable the user to input into the initial host device instructions as to which of the mobile devices is to be the host device;

if the instructions indicate that the initial host device is to be the host device, the initial host device controlling, as host device, the initial peripheral device as a peripheral device; and if the instructions indicate that the initial peripheral device is to be the host device, the initial host device passing control to the initial peripheral device to enable the initial peripheral device to control, as host device, the initial host device as a peripheral device.

Preferably, the method further comprises:

connecting a third mobile device to either the first or second mobile device;

the third mobile device communicating with the initial host device to determine that the third mobile device is to act as an initial peripheral device;

the initial host device providing a user of the initial host device on a display of the initial host device with options to enable the user to input into the initial host device instructions as to whether the third mobile device is to control any resources in either or both of the first and the second mobile devices;

the initial host device receiving instructions from the user in response to the options;

the initial host device passing control to the third mobile device of resources in either or both of the first and second mobile devices that have been specified are to be controlled from the third mobile device.

The present method thereby provides functionality whereby connections and Host/Peripheral behaviour can be customised by the user. This may improve user experience by reducing unwanted behaviour such as a device with low battery charge attempting to charge the battery of a device with higher battery charge.

According to a second aspect, the invention provides a method of controlling resources in at least two mobile devices, the method comprising:

connecting two mobile devices for communication with each other;

the mobile devices communicating with each other to determine which of the mobile devices is to act as an initial host device and which is to act as an initial peripheral device;

the initial host device providing a user of the initial host device on a display of the initial host device with options to enable the user to input into the initial host device instructions as to which of the mobile devices is to control particular resources in both the mobile devices;

the initial host device receiving instructions from the user in response to the options;

the initial host device maintaining control, as a first mobile device, of resources that have been specified in the instructions are to be controlled from the first mobile device, and passing control to the initial peripheral device, as a second mobile device, of resources that have been specified in the instructions are to be controlled from the second mobile device.

Preferably, the method further comprises:

connecting a third mobile device to either the first or second mobile device;

the third mobile device communicating with the initial host device to determine that the third mobile device is to act as an initial peripheral device;

the initial host device providing a user of the initial host device on a display of the initial host device with options to enable the user to input into the initial host device instructions as to whether the third mobile device is to control any resources in either or both of the first and the second mobile devices;

the initial host device receiving instructions from the user in response to the options;

the initial host device passing control to the third mobile device of resources in either or both of the first and second mobile devices that have been specified are to be controlled from the third mobile device.

The mobile device that controls a resource may be known as the master device with respect to that resource while the mobile device whose resource is being controlled may be known as the slave device with respect to that resource.

This method could be beneficial because it would allow a user to customise the use of specific resources. This would enable him or her to use the resources on different devices more efficiently in cases where different devices have different levels of capability in different resources and the standard Host/Peripheral relationship is not appropriate.

Preferably, there is provided a method whereby a user is able to specify that a mobile device is either public or private so that, if it is specified as a being private, access by a host device to the mobile device's resources is denied. Therefore, in one embodiment, the method further comprises:

designating one or more of the mobile devices as private;

if the initial peripheral device has been designed as private, the initial peripheral device sends a signal to the host device indicating that the initial peripheral device cannot act as a peripheral device;

in response to the host device receiving the signal, the options provided to the user by the host device are truncated so that the user cannot input instructions to use the initial peripheral device as a peripheral device.

In an alternative embodiment, the method further comprises:

designating one or more of the mobile devices as private;

if the initial peripheral device has been designed as private, the initial peripheral device sends a signal to the host device indicating that the initial peripheral device cannot act as a peripheral device;

in response to the host device receiving the signal, the host device automatically passing control to the initial peripheral device to enable the initial peripheral device to control, as host device, the host device as a peripheral device.

This may be beneficial because it would improve privacy by allowing the user to prevent access to a mobile device's functionality where appropriate.

Advantageously, there may further be provided a third privacy setting whereby access to a mobile device may be restricted so that a user who wishes to use resources on a connected mobile device must use an authentication method such as a password in order to gain access. If the password is input correctly, the mobile device will be treated as public, otherwise the mobile device will be treated as private, and the appropriate versions of the method will be used.

Preferably, there are provided heuristics for determining which mobile device is given initial host device or initial peripheral device status and behaviour where there is a conflict, settings are not available, or under any other circumstances where it is not clear which of two or more mobile devices should act as the initial host device.

Preferably, there is further provided a method whereby the user can select one of several pre-programmed profiles comprising Privacy settings Host/Peripheral behaviour Security settings as appropriate When a profile is selected, all the appropriate changes to settings may be made automatically.

Advantageously, there may be provided a method whereby the user can pre-set default Host/Peripheral behaviour between two or more devices depending on the classification of the devices in question. For example, he or she could set his or her tablet computer to always act as host device when connected to any smartphone but to always act as a peripheral device when connected to any laptop.

This method could affect the standard method of selection of the host device described above by reducing the number of options offered to the user by the initial host device, dictating which device acts as the initial host and/or bypassing the user's input altogether and instead treating settings that are stored in memory as input, depending on the exact embodiment.

This may be beneficial because it allows the user to make a single setting selection with regard to each classification of a mobile device to which the user's mobile device may be connected rather than having to configure each connection individually. This would be more convenient for the user. If such settings are pre-programmed as defaults, it would also be more straightforward for less technical users who may not understand the different settings. Because the classifications can include suppliers of a device, this would also make it possible for manufacturers to customise Host/Peripheral behaviour with regard to other devices made by the same manufacturer and also for corporate IT administrators to customise behaviour of devices issued by the company with regard to employees' personal devices and other devices issued by the company.

Classifications could include any of the following or any others that may occur to the reader:
Type of device (laptop, netbook, tablet, wearable, smartphone etc.)
Manufacturer/Vendor
Issuer
Owner There may also be provided a method for ranking different levels of settings such that a higher-ranked setting will override a lower-ranked setting. For example, if a laptop that is configured to always act as a host device is connected to a tablet computer that is configured to act as host device when connected to a laptop and the initial communication between the devices indicates that the mobile device that is preconfigured to act as host device will act as the initial host device, this could result in deadlock as both mobile devices will attempt to act as the initial host device. If a ranking is provided such that, for example, classification settings are higher-ranked than general settings, the tablet will act as the initial host device.

Alternatively, there may be provided a method of resolving conflicts between device settings, for example where two devices are connected to each other and they are both configured to always act as peripheral devices. This might otherwise result in the user being unable to use either mobile device due to a deadlock such as that described above. An example of such a method would be where the two mobile devices might share resources according to a Peer-to-Peer method as hereinafter described, or both mobile devices might display dialog boxes asking the user to select which mobile device should be the host device and which device should be the peripheral device, or one device might be selected according to a pseudo-random selection method to act as initial host device, after which the mobile devices behave according to the standard method as if there had been no conflict. This would improve the user experience by reducing the probability of deadlock between two mobile devices and, if a default behaviour is pre-programmed, it would mean that a user can connect devices seamlessly without needing to change settings beforehand, which would also improve the user experience.

Preferably, there is further provided a method whereby, where two or more devices are connected, if at any time one mobile device has more power available, that mobile device automatically charges the other mobile device or devices until the power levels are equal regardless of the Host/Peripheral status of the mobile devices. The difference in power may occur because one mobile device has a lower battery level to start with, because one mobile device is using battery power at a higher rate or because one mobile device is connected to AC power.

Preferably, there is further provided a method whereby if a peripheral device is being used as a display and has its own processor the host device is able to offload processing for the appropriate part of the display data and possibly the associated application to the peripheral device rather than dealing with processing and display itself.

Preferably, there is further provided a method for avoiding any interruption of processing whereby:
if the host device is executing processes that could be executed on a processor of a peripheral device, the host device detecting reliability of the connection between the host device and the peripheral device; and
the host device allocating the processes between the host device and the peripheral device based on the determined reliability of the connection such that important processes are not allocated to the peripheral device if the reliability of the connection does not exceed a predetermined threshold, either to provide a parallel processing cluster or to offload processing completely.

Preferably, further to the aforementioned provision of a method whereby a device can be configured as being public or private, there is provided a method whereby each resource on a device can be specified as being either public or private. This would be beneficial because it allows a user to exercise finer control over what functionality can be used by a connected mobile device, rather than simply setting all functionality to be public or private as a single unit.

Advantageously, there may further be provided a third privacy setting whereby a user who wishes to use a resource on a connected mobile device must use an authentication method such as a password in order to gain access. This would prevent unauthorised access to resources on a device while still allowing authorised access without the user having to change any settings, which would be more convenient and would also improve security on the grounds that the user is then less likely to leave a mobile device's resources public.

Preferably, there is provided a method whereby the user can select default Master/Slave behaviour between two or more connected devices depending on the classification of the devices in question.

For example, he or she could set his or her tablet computer to always act as Master device with respect to audio and processing when connected to any smartphone and to always act as Slave device with respect to display when connected to any laptop. This would be beneficial because it allows the user to make a single setting selection with regard to each classification of device to which the user's mobile device may be connected rather than having to configure each connection individually. This would be more convenient for the user. If such settings are pre-programmed as defaults, it would also be more straightforward for less technical users who may not understand the different settings.

Because the classifications can include suppliers of a device, this would also make it possible for manufacturers to customise Master/Slave behaviour with regard to other devices made by the same manufacturer and also for corporate IT administrators to customise behaviour of devices issued by the company with regard to employees' personal devices and other devices issued by the company.

Classifications could include any of the following or any other appropriate classifications that may occur to the reader:
Type of device (laptop, netbook, tablet, wearable, smartphone etc.)
Manufacturer/Vendor
Issuer
Owner Preferably, there is further provided a method of ranking different levels of settings such that a higher-ranked setting will override a lower-ranked setting. For example, if a laptop that is configured to always act as Master device with regard to processing is connected to a tablet computer that is configured to act as Master device with regard to processing when connected to a laptop, there might be deadlock, resulting in undesirable behaviour such as refusing to connect or requiring the settings to be adjusted on the spot, which would defeat the object of having pre-arranged settings. The configurations could be ranked such that classification settings are higher-ranked than general settings, for example, which would mean that the tablet will act as Master device with respect to processing.

Preferably, there is further provided a method of handling conflicts between mobile device settings, such that if two devices are connected to one another and each is configured to act as Master device or Slave device with regard to a particular resource or collection of resources when connected to a mobile device of a particular type (for example, two tablet computers, each configured to act as Master device with respect to display and audio when connected to another tablet computer) there will be no undesirable behaviour such as both devices attempting to act as Slaves and neither supplying audio or display data to the other.

For example, the two devices might share resources according to a Peer-to-Peer method as hereinafter described, or one device, for example, the initial host device, might display a dialog box asking the user to select which device should be Master device and which device should be Slave device with regard to that resource regardless of settings. This would improve the user experience by reducing the probability of deadlock between two mobile devices and, if a default behaviour is pre-programmed, it will mean that a user can connect devices seamlessly without needing to change settings beforehand, which will also improve the user experience.

Preferably, there is further provided a method whereby if two or more devices are connected and no individual device is configured to act as Master device with respect to a particular resource the Master device can be automatically selected with regard to the mobile devices' capabilities with regard to that resource. The selection could be on the grounds of superior capability, such as display size; available power or bandwidth; or any other appropriate attribute.

Preferably, there is further provided a method whereby if two devices are connected and one mobile device is acting as Master device and the other as Slave device with regard to the Slave device's display functionality, and the Slave device has its own processor, the Master device is able to offload processing for the appropriate part of the display data and possibly the associated application to the Slave device rather than dealing with processing and display itself. This may be made subject to Master/Slave and privacy settings with regard to processing power on the two mobile devices.

For example, if the user has connected a tablet computer to a laptop and is using the tablet computer as a display, configured to show an extended desktop from the laptop, the laptop only sends instructions and any extra data to the tablet computer, as opposed to processed display data, and any specific programming such as showing the movement of a mouse cursor is handled on the tablet computer.

This may be beneficial because it may improves scalability: many mobile devices could be connected to one another in order to provide a large distributed display without relying on the processing power of a single mobile device. It may also mean that where a Slave device has superior graphics capabilities to those of the Master device graphics processing can be performed on the Slave device, resulting in superior output and an improved user experience.

According to one embodiment, the instructions may specify that at least some resources are to be controlled on a peer-to-peer basis and control of those resources is shared between the first mobile device and the second mobile device Preferably, as part of the communication between the devices during which they negotiate initial host device and initial peripheral device status, there is provided a method whereby the mobile devices are made aware of which resources on each mobile device are configured as being public or private as hereinbefore described and these resources are not made available for Peer-to-Peer configuration.

Advantageously, there may further be provided a method whereby the user is asked to use an authentication method in order to configure private resources for peer-to-peer use, as described above.

Preferably, there is provided a method whereby Peer-to-Peer use of resources can be included in any of the profiles, defaults and/or pre-programmed settings described in the second aspect of the invention.

Advantageously, there may be provided a method whereby the processors of two or more connected mobile devices may be used as a single parallel processing cluster, regardless of the type of data. This would be advantageous because it would take best advantage of the fact that all the devices that are connected have their own processors and would allow faster processing overall.

Advantageously, there may further be provided a method whereby a mobile device that is sharing processing on a Peer-to-Peer basis is aware of the security of a connection and automatically allocates processing accordingly in order to safeguard data. For example, if a connection is not secure a host device could refrain from sharing processing even if it is able to in order to minimise the chances of data or instructions being intercepted. This would be beneficial because it would improve security for both user data and application code.

Advantageously, there may also be provided a method whereby an application installed on one device ("Device 1") may be run on another ("Device 2") on which it is not installed and which therefore does not have any of the appropriate instructions stored locally, comprising:

Device 2 sending a request across the connection to Device 1 for an application;

Device 1 loading the necessary instructions to run the application;

Device 1 sending the instructions in raw or compressed form, such that Device 2 will be able to execute them without further installation or configuration;

Device 2 executing the instructions on locally-stored data;

Device 2 immediately removing the instructions from all local storage upon execution.

This would be beneficial because it would allow a user to run an application on Device 2 that is not installed on Device 2, but there will be no way to store the application on Device 2 and no way to run the application unless the devices are currently connected, so the application is not copied.

According to another aspect of the invention, there is provided a mobile device with a collection of one or more resources, configured to carry out any of the methods with regard to connection and configuration of Host/Peripheral, Peer-to-Peer or Master/Slave status that are set out above.

Preferably, the mobile device is further configured such that some of its resources can be kept private and not used by other devices regardless of its status as host device, peripheral device, Master device, or Slave device and regardless of whether it is configured to act in a Peer-to-Peer manner.

Preferably, the mobile device is configured with default behaviours with regard to privacy, Host/Peripheral and/or Master/Slave behaviour, and conflict resolution which can be suggested to the user or used if, for any reason, the user's configured behaviours are impossible.

According to a further aspect of the invention, there is provided a system consisting of two or more of the above-described mobile devices connected either wired or wirelessly in any appropriate manner and arranged to carry out any combination of one or more of the above-described methods.

BRIEF DESCRIPTION OF THE DRAWINGS

The invention will now be more fully described, by way of example, with reference to the drawings, of which.

DETAILED DESCRIPTION OF THE INVENTION

Figure 1:
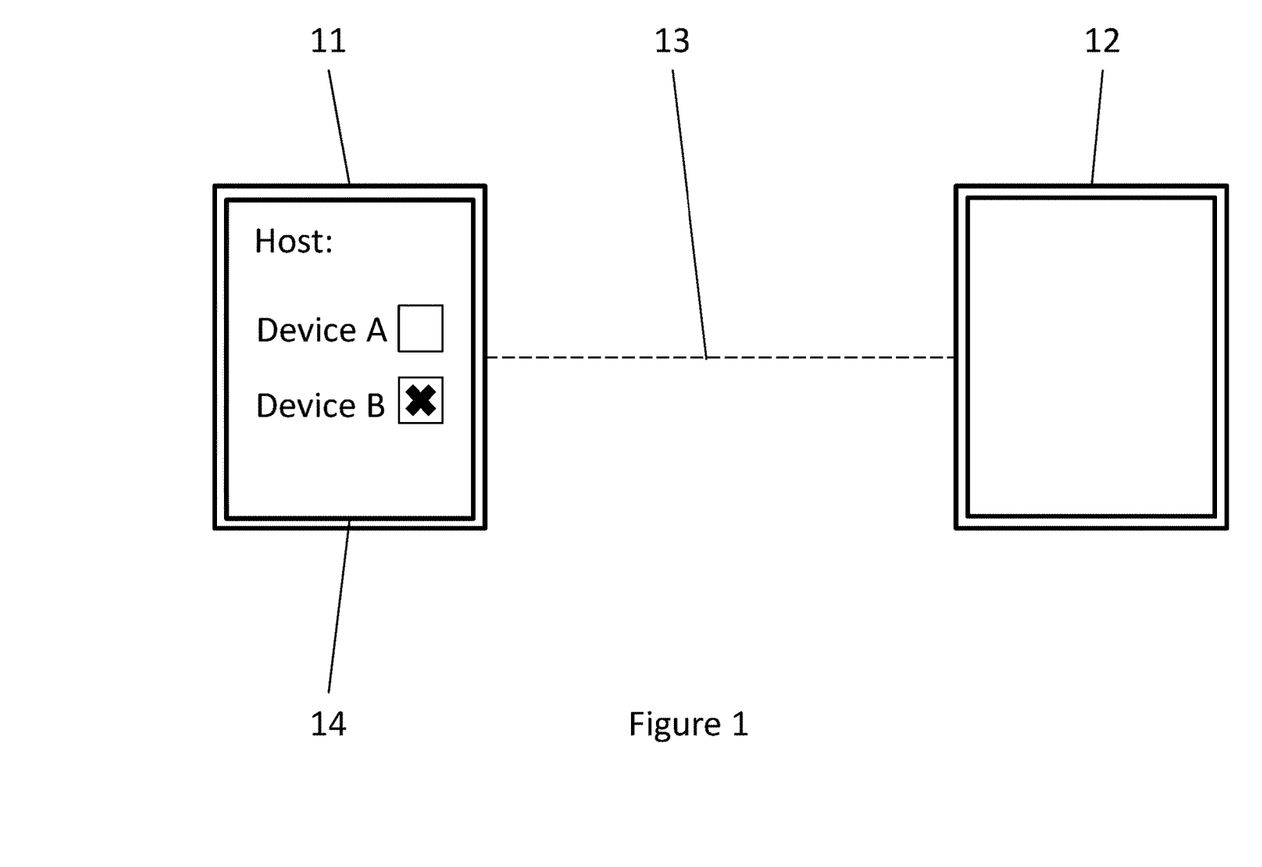
FIG. 1 shows a system of two mobile devices connected according to the first embodiment of the invention.

As shown in FIG. 1, two mobile devices, Device A [11] and Device B [12] are connected using, in this example, a wireless link, such as a Bluetooth connection [13]. Since the connection [13] is capable of carrying data, the devices [11, 12] communicate with one another in order to set up the system.

Figure 2:
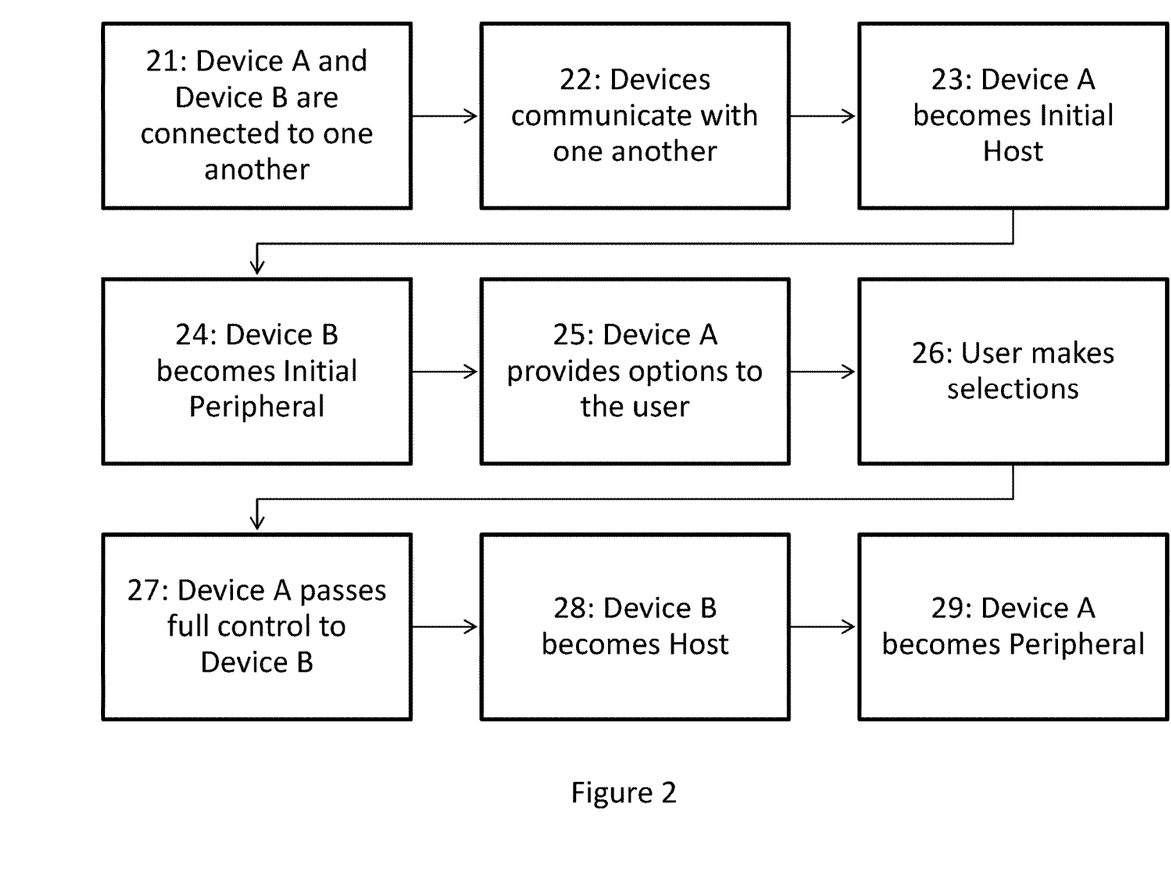
FIG. 2 shows a flowchart of the operation of the system of FIG. 1.

The process is shown in FIG. 2, where the initial connection is indicated as step 21 and the communication between them is shown at Step 22. The communication leads to the two devices determining which of them is to function as an initial host device, in order to control later steps in the process, and which is to function as an initial peripheral device. This determination may be made based on pre-existing settings on the two devices, a pseudo-random selection algorithm or any other selection process. In this example, Device A [11] has previously been configured to always act as initial host device and Device B [12] has no conflicting settings. Device A [11] therefore automatically becomes the initial host device, as shown in Step 23. When Device A [11] becomes the initial host device, it sends a signal to this effect to Device B [12], which therefore becomes the initial peripheral device (Step 24).

At Step 25, Device A [11] then provides options [14] to the user, in this embodiment by displaying checkboxes on its internal screen that the user can use to select which of the two devices [11, 12] should act as host device. In this example, the user selects Device B and inputs this into Device A [11] (Step 26).

Since Device B [12] is to be the host device, at Device A [11] passes full control of all resources to Device B [12], as shown in Step 27. Device B [12] then becomes the host device (Step 28) and Device A [11] becomes the peripheral device (Step 29). This configuration lasts for as long as the two devices are connected.

Figure 3:
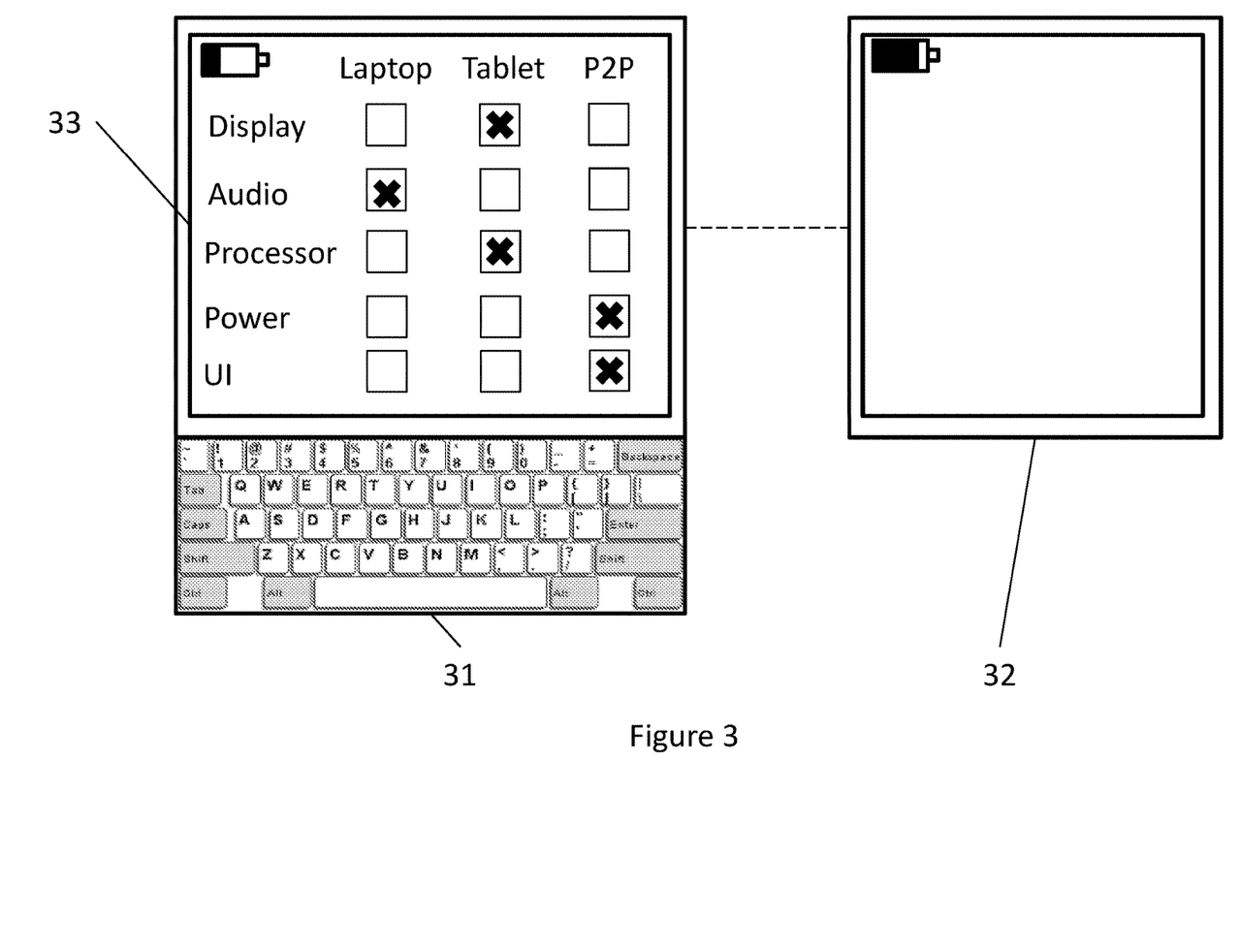
FIG. 3 shows a system of two mobile devices connected according to a second embodiment of the invention.
Figure 4:
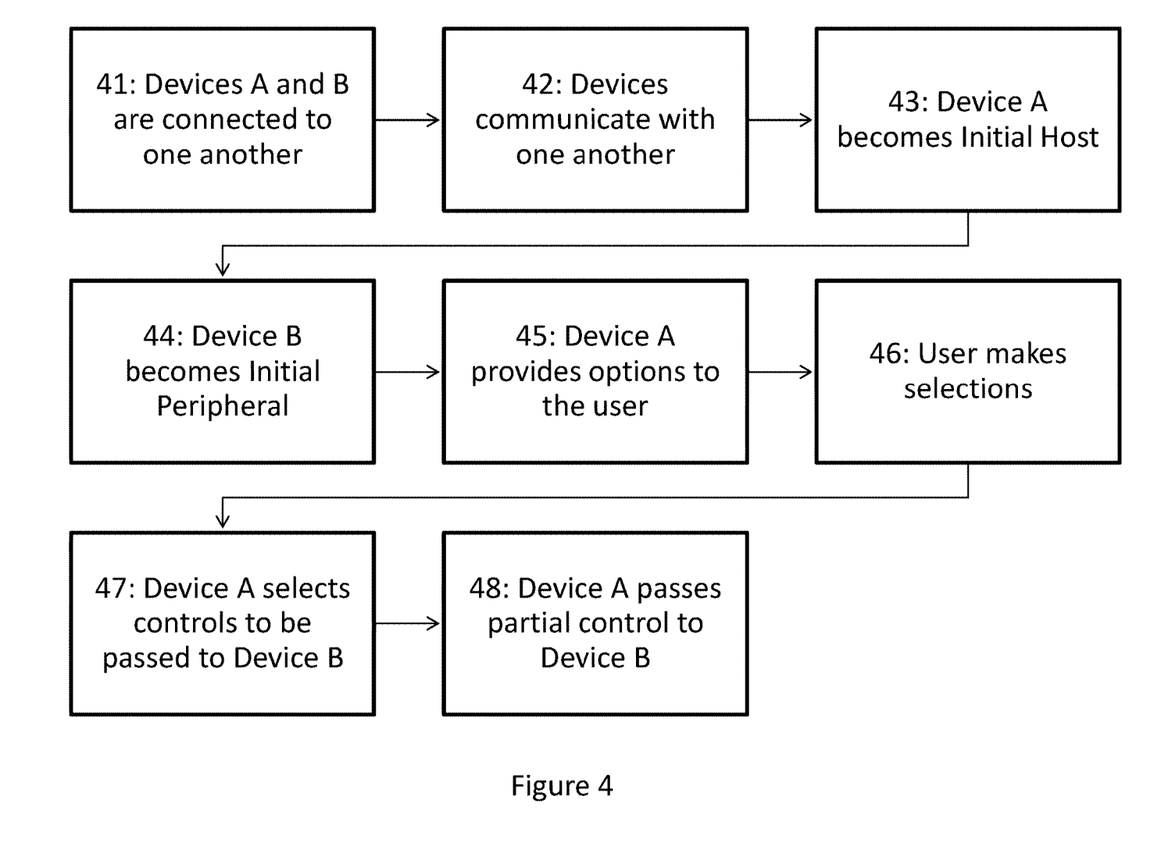
FIG. 4 shows a flowchart of the operation of the system of FIG. 3.

As shown in FIG. 3, two devices, a laptop [31] and a tablet computer [32], are connected, in this example by a USB cable. The devices [31, 32] then communicate with one another in order to set up the system, and during this process they also negotiate which device [31, 32] will be the initial host device. The process is shown in FIG. 4, where the initial connection is indicated as step 41 and the communication between them is shown at Step 42. The communication leads to the two devices determining which of them is to function as an initial host device, in order to control later steps in the process, and which is to function as an initial peripheral device. As in the embodiment of FIG. 1, the initial host device could be selected via pre-existing settings, a pseudo-random selection algorithm or any other selection process. In this embodiment, the device into which the USB cable was plugged first becomes the initial host device. This is the laptop [31] (Step 43). The laptop [31] then sends a signal to the tablet computer [32] instructing it to become the initial peripheral device, which it then does (Step 44).

The laptop [31] then provides options [33] to the user for which device should control each resource, or whether particular resources should be controlled on a Peer-to-Peer basis. The user then enters selections as shown in FIG. 3.

In this example, the laptop [31] is to control the audio (be the Master with respect to audio). This means that the laptop [31] supplies audio data to be output through the speakers or headphones attached to the tablet computer [32]. The tablet computer [32] is Master with respect to display and processing. This means that the integral screen on the laptop [31] will be used as the display, showing data provided by the tablet computer [32], and the tablet computer [32] is also able to access the laptop's [31] processor where necessary. The laptop [31] cannot do the same for the integral screen and processor of the tablet computer [32]. Power and user input are configured to be handled on a Peer-to-Peer basis. This means that the device with the higher battery power (in this case the tablet computer [32]) will charge the device with the lower battery power (in this case the laptop [31]), and that the user input devices—a keyboard on the laptop [31] and a touchscreen on the tablet computer [32]—can be used equally for input.

Once the user has entered these selections, the laptop [31] processes them in order to select the appropriate controls to transfer to the tablet computer [32] (Step 47). It then relinquishes control of its display and processor to the tablet computer [32] while retaining control of the tablet computer's [32] audio output capabilities (Step 48). Both devices [31, 32] share control of power and input as described above.

Figure 5:
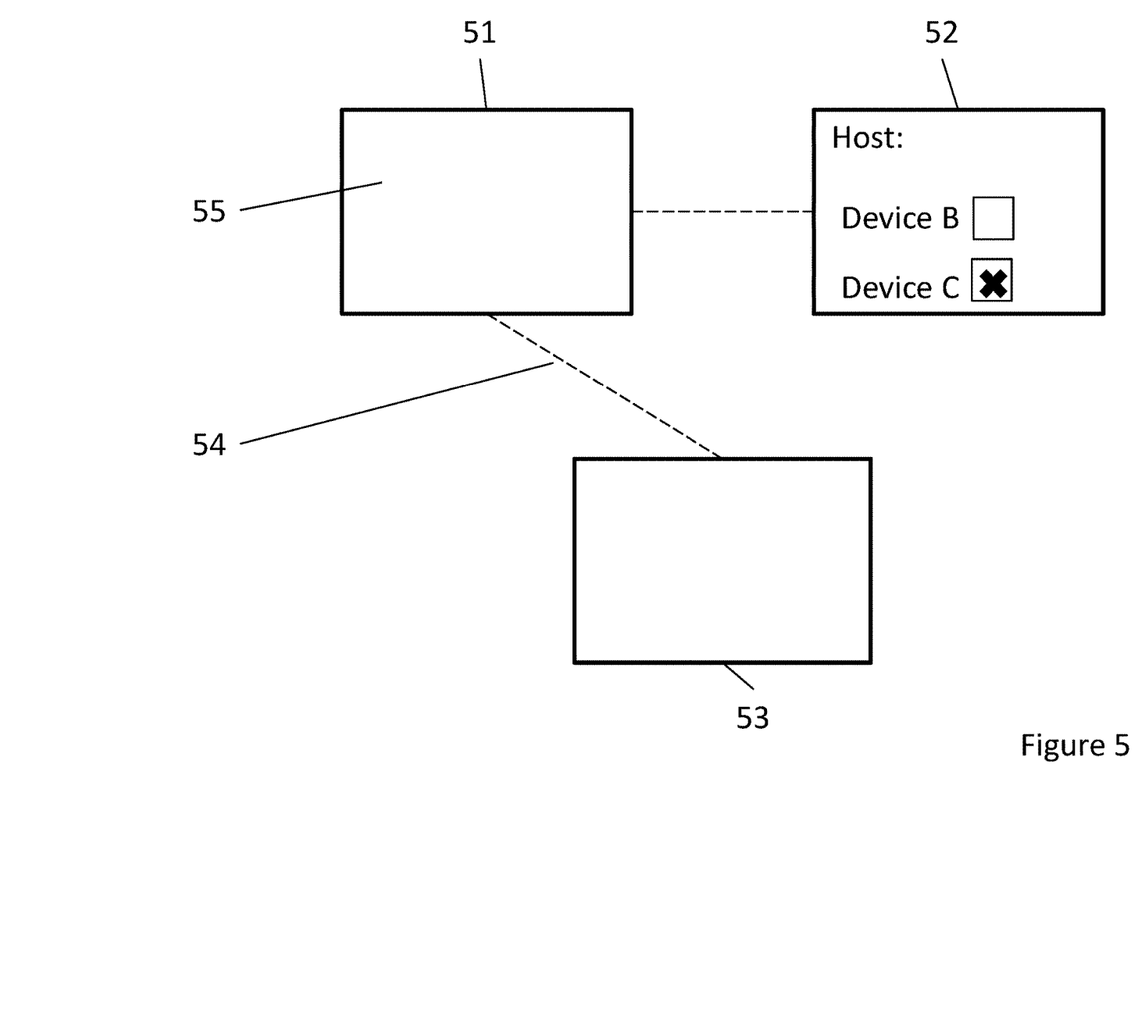
FIG. 5 shows a system of three mobile devices connected according to a third embodiment of the invention.

In FIG. 5, there is shown a system where two devices (Device A [51] and Device B [52]) are connected wirelessly as described above with reference to FIGS. 1 and 2. A new Device C [53] then connects to Device A [51] via a similar wireless connection [54].

Since Device B [52] is the host device, it sends a signal to Device C [53], either via Device A [51] or directly, if that is possible, that Device C [53] should function as an initial peripheral device. Device B [52] then provides options so that the user can select which of the current host device (Device B [52]) and Device C[53] should be the new host device. Device B [52] then receives the user's input.

In this example, the user selects Device C [53] as the new host device. Device B [52] therefore passes control of all its resources to Device C [53], whereupon Device C [53] becomes the new host device and Devices A [51] and B [52] become peripheral devices.

Many other functionalities and behaviours can be achieved using the processes of the invention and some of these will be further described below. For clarity, in these examples the connection will be described as between a smartphone and a laptop where—if relevant—the laptop defaults to acting as the host device and therefore will act as the initial host device. However, it should be understood that this is by way of example only and in no way limits the scope of the claims with regard to types, behaviour or number of devices.

All of these behaviours are examples only and do not define or limit the scope of the claims.

Instead of being selected by the user, privacy and Host/Peripheral or Master/Slave behaviour may be pre-programmed into a device or installed automatically as part of a driver or application. For example, a manufacturer may program a device to always keep its processing power private. Alternatively, a particular device may be designated at manufacture to always connect as an initial peripheral device and then act as a peripheral device, regardless of other circumstances.

It could also be possible for an issuer or vendor of a device to configure it through a special interface that only the issuer or vendor (or, perhaps some other authorised entity or person) could access. For example, if a company issues laptops and smartphones to its employees, it might configure its devices to notify other devices on connection of the fact that they come from that particular company. They could then configure the devices to change their privacy and Host/Peripheral or Master/Slave settings on a classification basis such that, for example, a company smartphone's functionality is always private with respect to an outside device but it will always connect and act as a peripheral device with full functionality if connected to another company smartphone or a company laptop.

The user could also download or install a driver or application that automatically changes the settings of the device. For example, a driver might be required on a laptop in order to use a smartphone as an external monitor and this driver could automatically set image processing to be Peer-to-Peer in order to take best advantage of the smartphone's capabilities.

A further possible classification is Owner. This would mean that a user could configure his or her own smartphone and laptop to behave in a specific manner towards one another and differently towards other devices. The Owner classification could be set during initial setup of a device on purchase, or could be set later via, for example, a dialog box only accessible to the device's administrator. Examples of useful behaviour include:
- A device's functionality is public when it is connected to another device belonging to the same user, but private otherwise.
- A device is automatically a peripheral device when connected to another device belonging to the same user and otherwise behaves in a default manner.

Charging could behave differently from other resources. For example, if a laptop and smartphone are each set to keep their respective resources private, one could still charge from the other. This would mean that a smartphone could be connected to a laptop for charging but privacy could be maintained and the devices could still be used independently.

It could also be beneficial to ensure that if a smartphone is connected to a laptop there will be no connection beyond the negotiation of initial host device and initial peripheral device status and the user will not have to install drivers when he or she wishes to charge the smartphone.

Defaults could apply to privacy settings, Host/Peripheral, and/or Master/Slave settings. For example, a mobile device might keep all its resources private by default, or have finer default settings such as keeping data stored on its internal hard drive private but allowing access to its screen and audio output. Alternatively, the device may have a variety of privacy profiles, each with different fine-granularity privacy settings.

Default behaviour would also be necessary where classification settings are used to determine Host, Peripheral, Master and Slave settings, since a device might encounter a classification of device for which it has no settings. For example, a smartphone might be configured to always act as a peripheral device when connected to a laptop, but have no settings for its behaviour when connected to a tablet computer. Possible default behaviours include:
- Displaying a dialog box asking the user whether it should act as a Host, act as a Peripheral, not Connect, or share its Resources on a peer-to-peer basis
- Displaying a dialog box offering a variety of possible Connection profiles
- Automatically choosing one of the above options, perhaps depending on the Resources and settings of the other device
- Behaving as under the current art, which may mean acting as Peripheral without further input, charging only, or failing to Connect.

The same may apply where, for example, a smartphone is configured to behave in a particular way towards devices from the same manufacturer or supplier but has no other settings and is then connected to a laptop from a different manufacturer or supplier.

If two devices that are both set to automatically be Hosts or Peripherals or Masters or Slaves with respect to the same resource, there must be a default behaviour for which will act as Host and which as Peripheral in order to avoid deadlock. Possible default behaviours include:
- Automatically choosing which device will act as Host or Master at random
- The devices do not connect
- One or both devices display a dialog box or other selection mechanism requesting input from the user as if there were no pre-configured settings.
- One or both devices display a dialog box offering a variety of possible connection profiles.
- The devices behave as they would under the current art. This may mean that the device most like a standard desktop computer acts as the Host, only charging is possible, or the devices do not connect
- The devices automatically connect on a Peer-to-Peer basis
- One device is automatically chosen as Host depending on its resources and other settings. Heuristics could include:
    - The device with the highest battery charge acts as Host (if they are the same, fall back on another method)
    - The device with the most processing power acts as Host (if they are the same, fall back on another method)
    - The device with the most restrictive privacy settings acts as Host (if they are the same, fall back on another method)

Peer-to-Peer behaviours could comprise either the smartphone and laptop using one other's resources freely and equally, or sharing resources where appropriate. Such behaviour could also include combining the aforementioned categories of behaviour depending on the type of functionality in question. Examples of both these types of behaviour include:

Users can access data stored on the hard disk of either device from either device, rather than being able to access data stored on both devices from the Host or Master, but only data stored on the Peripheral or Slave from the Peripheral or Slave.

Both devices retain control their own displays, but the user of one device can still send application windows to be displayed on the other device's display. For example, a user on the laptop who is looking at photographs is able to send a photograph to the display of the smartphone, which otherwise is displaying its own data rather than acting as an extended display, and vice versa.

Similar behaviour as described above with regard to display data, but applied to audio data.

The user interfaces of the devices could be shared such that the user is able to use the keyboard and mouse of the laptop to control the smartphone and the touchscreen of the smartphone to control the laptop (likewise the microphone, camera or any other input method on either device).

There are a variety of situations in which the user may wish to configure the system and the configuration screens could appear at any of these times or at any other time or under any combination of circumstances that may occur to the reader.

Examples include:

When the user requests a configuration screen from a settings menu. This may be by a menu selection, a combination of hotkeys, a voice command or any other method that may occur to the reader.

The privacy and default behaviour configuration windows could appear every time a device is booted.

The privacy and default behaviour configuration windows could appear only the first time a device is booted, during initial setup.

The connection configuration window could appear every time two devices are connected.

The connection configuration window could appear only the first time two devices are connected, perhaps as part of driver installation where appropriate.

The example user interfaces herein described have used checkboxes to indicate user selections, but any other selection method could be used, including menus, slider bars, text fields or any other method that may occur to the reader.

Although only one particular embodiment has been described in detail above, it will be appreciated that various changes, modifications and improvements can be made by a person skilled in the art without departing from the scope of the present invention as defined in the claims. For example, hardware aspects may be implemented as software where appropriate and vice versa.

The invention claimed is:

1. A method of determining which of at least two mobile devices is to function as a host device, the method comprising:
   connecting two mobile devices for communication with each other;
   the mobile devices communicating with each other to determine which of the mobile devices is to act as an initial host device and which is to act as an initial peripheral device;
   the initial host device providing a user of the initial host device on a display of the initial host device with options to enable the user to input into the initial host device instructions as to which of the mobile devices is to be the host device and which is to be a peripheral device;
   if the instructions indicate that the initial host device is to be the host device, the initial host device controlling, as host device, the initial peripheral device as a peripheral device;
   if the instructions indicate that the initial peripheral device is to be the host device, the initial host device passing control to the initial peripheral device to enable the initial peripheral device to control, as host device, the initial host device as a peripheral device;
   designating one or more of the mobile devices as private;
   if an initial peripheral device has been designated as private, the initial peripheral device sends a signal to the host device or initial host device indicating that the initial peripheral device cannot act as a peripheral device; and
   in response to the host device or initial host device receiving the signal, the host device or initial host device automatically passing control to the initial peripheral device to enable the initial peripheral device to control, as host device, the host device or initial host device as a peripheral device.

2. The method according to claim 1, further comprising:
   connecting a third mobile device to either of the two mobile devices;
   the third mobile device communicating with the host device to determine that the third mobile device is to act as an initial peripheral device;
   the host device providing a user of the host device on a display of the host device with one or more options to enable the user to input into the host device instructions as to whether the third mobile device is to be the host device;
   the host device receiving instructions from the user in response to the options;
   if the instructions indicate that the host device is to remain as the host device, the host device controlling, as host device, the third mobile device as a peripheral device; and
   if the instructions indicate that the third mobile device is to be the host device, the host device passing control to the third mobile device to enable the third mobile device to control, as host device, the two mobile devices as peripheral devices.

3. The method according to claim 1, further comprising:
   in response to the host device or initial host device receiving the signal, the options provided to the user by the host device or initial host device are truncated so that the user cannot input instructions to use the initial peripheral device as a peripheral device.

4. The method according to claim 3, further comprising:
   designating one or more of the mobile devices as restricted;
   if an initial peripheral device has been designated as restricted, the initial peripheral device sends a signal to the host device or initial host device indicating that the initial peripheral device is restricted;
   in response to the host device or initial host device receiving the signal, the host device or initial host device providing a user on the display with options to enable the user to input authentication instructions to enable the host device or initial host device to authenticate the restricted initial peripheral device;

the host device or initial host device receiving instructions from the user in response to the options;

in response to the host device or initial host device receiving the instructions, the host device or initial host device authenticating the initial peripheral device to enable the host device or initial host device to control the initial peripheral device as a peripheral device; and in response to the host device or initial host device being unable to authenticate the initial peripheral device, the initial peripheral device being treated as being designated private.

5. The method according to claim 1, further comprising:
designating one or more resources of one or more of the mobile devices as private;

if one or more resources of an initial peripheral device have been designated as private, the initial peripheral device sends a signal to the host device or initial host device indicating that one or more resources of the initial peripheral device are designated as private;

in response to the host device or initial host device receiving the signal, the options provided to the user by the host device or initial host device are truncated so that the user cannot input instructions to use the one or more resources that are designated as private.

6. The method according to claim 5, further comprising:
designating one or more resources of one or more of the mobile devices as restricted;

one or more resources of an initial peripheral device have been designated as restricted, the initial peripheral device sends a signal to the host device or initial host device indicating that one or more resources of the initial peripheral device are designated as restricted;

in response to the host device or initial host device receiving the signal, the host device or initial host device providing a user on the display with options to enable the user to input authentication instructions to enable the host device or initial host device to authenticate the restricted one or more resources of the initial peripheral device;

the host device or initial host device receiving instructions from the user in response to the options;

in response to the host device or initial host device receiving the instructions, the host device or initial host device authenticating the restricted one or more resources of the initial peripheral device to enable the host device or initial host device to control the restricted one or more resources of the initial peripheral device; and in response to the host device or initial host device being unable to authenticate the restricted one or more resources of the initial peripheral device, the restricted one or more resources of the initial peripheral device being treated as being designated private.

7. The method according to claim 1, further comprising:
designating a classification of each of the mobile devices;

each initial peripheral device sending a signal to the host device or initial host device indicating its designated classification;

in response to the host device or initial host device receiving the signal, the options provided to the user by the host device or initial host device are truncated according to the relative classifications of the mobile devices.

8. The method according to claim 7, wherein the classification comprises one or more of:
Type of device (laptop, netbook, tablet, wearable, smartphone etc.)
Manufacturer/Vendor
Issuer
Owner.

9. The method according to claim 1, wherein determining which of the mobile devices is to act as an initial host device and which is to act as an initial peripheral device comprises any one or more of:
determining relative priorities of the mobile devices;
determining relative status of the mobile devices;
determining relative rank of the mobile devices;
determining settings of the mobile devices;
using predetermined heuristics.

10. The method according to claim 1, further comprising:
designating one or more of the mobile devices as restricted;

if an initial peripheral device has been designated as restricted, the initial peripheral device sends a signal to the host device or initial host device indicating that the initial peripheral device is restricted;

in response to the host device or initial host device receiving the signal, the host device or initial host device providing a user on the display with options to enable the user to input authentication instructions to enable the host device or initial host device to authenticate the restricted initial peripheral device;

the host device or initial host device receiving instructions from the user in response to the options;

in response to the host device or initial host device receiving the instructions, the host device or initial host device authenticating the initial peripheral device to enable the host device or initial host device to control the initial peripheral device as a peripheral device; and in response to the host device or initial host device being unable to authenticate the initial peripheral device, the initial peripheral device being treated as being designated private.

11. A method of controlling resources in at least two mobile devices, the method comprising:
connecting two mobile devices for communication with each other;

the mobile devices communicating with each other to determine which of the mobile devices is to act as an initial host device and which is to act as an initial peripheral device;

the initial host device providing a user of the initial host device on a display of the initial host device with options to enable the user to input into the initial host device instructions as to which of the mobile devices is to control particular resources in both the mobile devices;

the initial host device receiving instructions from the user in response to the options;

the initial host device maintaining control, as a first mobile device, of resources that have been specified in the instructions are to be controlled from the first mobile device, and passing control to the initial peripheral device, as a second mobile device, of resources that have been specified in the instructions are to be controlled from the second mobile device;

designating one or more of the mobile devices as private;

if an initial peripheral device has been designated as private, the initial peripheral device sends a signal to the host device or initial host device indicating that the initial peripheral device cannot act as a peripheral device;

in response to the host device or initial host device receiving the signal, the host device or initial host device automatically passing control to the initial peripheral device to enable the initial peripheral device to control, as host device, the host device or initial host device as a peripheral device.

12. The method according to claim 11, further comprising:

connecting a third mobile device to either the first or second mobile device;

the third mobile device communicating with the initial host device to determine that the third mobile device is to act as an initial peripheral device;

the initial host device providing a user of the initial host device on a display of the initial host device with options to enable the user to input into the initial host device instructions as to whether the third mobile device is to control any resources in either or both of the first and the second mobile devices;

the initial host device receiving instructions from the user in response to the options;

the initial host device passing control to the third mobile device of resources in either or both of the first and second mobile devices that have been specified are to be controlled from the third mobile device.

13. The method according to claim 11, wherein the instructions specify that at least some resources are to be controlled on a peer-to-peer basis and control of those resources is shared between the first mobile device and the second mobile device.

14. The method according to claim 11, further comprising:

in response to the host device or initial host device receiving the signal, the options provided to the user by the host device or initial host device are truncated so that the user cannot input instructions to use the initial peripheral device as a peripheral device.

15. The method according to claim 11, further comprising:

designating one or more of the mobile devices as restricted;

if an initial peripheral device has been designated as restricted, the initial peripheral device sends a signal to the host device or initial host device indicating that the initial peripheral device is restricted;

in response to the host device or initial host device receiving the signal, the host device or initial host device providing a user on the display with options to enable the user to input authentication instructions to enable the host device or initial host device to authenticate the restricted initial peripheral device;

the host device or initial host device receiving instructions from the user in response to the options;

in response to the host device or initial host device receiving the instructions, the host device or initial host device authenticating the initial peripheral device to enable the host device or initial host device to control the initial peripheral device as a peripheral device; and in response to the host device or initial host device being unable to authenticate the initial peripheral device, the initial peripheral device being treated as being designated private.

16. The method according to claim 11, further comprising:

designating one or more of the mobile devices as restricted;

if an initial peripheral device has been designated as restricted, the initial peripheral device sends a signal to the host device or initial host device indicating that the initial peripheral device is restricted;

in response to the host device or initial host device receiving the signal, the host device or initial host device providing a user on the display with options to enable the user to input authentication instructions to enable the host device or initial host device to authenticate the restricted initial peripheral device;

the host device or initial host device receiving instructions from the user in response to the options;

in response to the host device or initial host device receiving the instructions, the host device or initial host device authenticating the initial peripheral device to enable the host device or initial host device to control the initial peripheral device as a peripheral device; and in response to the host device or initial host device being unable to authenticate the initial peripheral device, the initial peripheral device being treated as being designated private.

17. The method according to claim 11, further comprising:

designating one or more resources of one or more of the mobile devices as private;

if one or more resources of an initial peripheral device have been designated as private, the initial peripheral device sends a signal to the host device or initial host device indicating that one or more resources of the initial peripheral device are designated as private;

in response to the host device or initial host device receiving the signal, the options provided to the user by the host device or initial host device are truncated so that the user cannot input instructions to use the one or more resources that are designated as private.

18. The method according to claim 17, further comprising:

designating one or more resources of one or more of the mobile devices as restricted;

one or more resources of an initial peripheral device have been designated as restricted, the initial peripheral device sends a signal to the host device or initial host device indicating that one or more resources of the initial peripheral device are designated as restricted;

in response to the host device or initial host device receiving the signal, the host device or initial host device providing a user on the display with options to enable the user to input authentication instructions to enable the host device or initial host device to authenticate the restricted one or more resources of the initial peripheral device;

the host device or initial host device receiving instructions from the user in response to the options;

in response to the host device or initial host device receiving the instructions, the host device or initial host device authenticating the restricted one or more resources of the initial peripheral device to enable the host device or initial host device to control the restricted one or more resources of the initial peripheral device; and in response to the host device or initial host device being unable to authenticate the restricted one or more resources of the initial peripheral device, the restricted one or more resources of the initial peripheral device being treated as being designated private.

19. The method according to claim 11, further comprising:
designating a classification of each of the mobile devices;
each initial peripheral device sending a signal to the host device or initial host device indicating its designated classification;
in response to the host device or initial host device receiving the signal, the options provided to the user by the host device or initial host device are truncated according to the relative classifications of the mobile devices.

20. The method according to claim 19, wherein the classification comprises one or more of:
Type of device (laptop, netbook, tablet, wearable, smartphone etc.)
Manufacturer/Vendor
Issuer
Owner.

21. The method according to claim 11, wherein determining which of the mobile devices is to act as an initial host device and which is to act as an initial peripheral device comprises any one or more of:
determining relative priorities of the mobile devices;
determining relative status of the mobile devices;
determining relative rank of the mobile devices;
determining settings of the mobile devices;
using predetermined heuristics.

22. A mobile device, acting as a first mobile device, comprising:
connection means configured to connect the first mobile device to a second mobile device for communication therewith;
communication means configured to communicate with the second mobile device to determine which mobile device is to act as an initial host device and which mobile device is to act as an initial peripheral device; and
control means configured to control the first mobile device as an initial host device, if the first mobile device is determined to act as the initial host device;
wherein the control means are configured to provide, if the first mobile device is acting as the initial host device, on a display of the first mobile device, options to enable a user to input instructions as to which of the mobile devices is to be the host device;
wherein the control means are configured to control, if the instructions indicate that the initial host device is to be the host device, the first mobile device as host device and to control the second mobile device as a peripheral device; and
wherein the control means are configured to pass control, if the instructions indicate that the second mobile device is to be the host device, to the second mobile device to enable the second mobile device to be the host device to control the first mobile device as a peripheral device;
and wherein the first mobile device is designated as private;
the first mobile device is configured to send a signal, if the first mobile device acts as an initial peripheral device, to the host device or initial host device indicating that first mobile device cannot act as a peripheral device; and
the first mobile device is configured to receive instructions from the host device or initial host device passing control to the first mobile device to enable the first mobile device to control, as host device, the host device or initial host device as a peripheral device.

23. The mobile device according to claim 22, wherein:
the connection means are configured to connect to a third mobile device;
the communication means are configured to communicate, if the first mobile device is acting as the host device, with the third mobile device to determine that the third mobile device is to act as an initial peripheral device;
the control means are configured to provide on the display options to enable the user to input into the first mobile device instructions as to whether the third mobile device is to be the host device;
the control means are configured to receive instructions from the user in response to the options;
the control means are configured to control, if the instructions indicate that the first mobile device is to remain as the host device, the third mobile device as a peripheral device; and
the control means are configured to pass control, if the instructions indicate that the third mobile device is to be the host device, to the third mobile device to enable the third mobile device to control, as host device, the first and second mobile devices as peripheral devices.

24. The mobile device according to claim 22, wherein:
the first mobile device is designated as restricted;
the first mobile device is configured to send a signal to the host device or initial host device indicating that the first mobile device is restricted;
the first mobile device is configured to communicate with the host device or initial host device to authenticate the first mobile device to enable the host device or initial host device to control the first mobile device as a peripheral device.

25. The mobile device according to claim 22, wherein:
one or more resources of the first mobile device are designated as restricted;
the first mobile device is configured to send a signal to the host device or initial host device indicating that one or more resources of the first mobile device are designated as restricted;
the first mobile device is configured to communicate with the host device or initial host device to authenticate the restricted one or more resources of the first mobile device to enable the host device or initial host device to control the restricted one or more resources of the first mobile device.

26. The mobile device according to claim 22, wherein:
the first mobile device is designating with a classification;
the first mobile device is configured to send a signal to the host device or initial host device indicating its designated classification, wherein the classification comprises one or more of:
Type of device (laptop, netbook, tablet, wearable, smartphone etc.)
Manufacturer/Vendor
Issuer
Owner.

27. A system comprising at least two mobile devices wherein at least one of the at least two mobile devices comprises a mobile device according to claim 22.

28. A mobile device, acting as a first mobile device, comprising:
- connection means configured to connect the first mobile device to a second mobile device for communication therewith;
- communication means configured to communicate with the second mobile device to determine which mobile device is to act as an initial host device and which mobile device is to act as an initial peripheral device; and
- control means configured to control the first mobile device as an initial host device;
- wherein the control means are configured to provide, if the first mobile device is to act as the initial host device, on a display of the first mobile device, options to enable a user to input instructions as to which of the mobile devices is to control particular resources in the mobile devices;
- wherein the control means are configured to receive instructions from the user in response to the options;
- wherein the control means are configured to control, if the first mobile device is acting as the initial host device, resources that have been specified in the instructions are to be controlled from the first mobile device, and to pass control to the second mobile device of resources that have been specified in the instructions are to be controlled from the second mobile device; and wherein:
- the first mobile device is designated as private;
- the first mobile device is configured to send a signal, if the first mobile device acts as an initial peripheral device, to the host device or initial host device indicating that the first mobile device cannot act as a peripheral device; and
- the first mobile device is configured to receive instructions from the host device or initial host device passing control to the first mobile device to enable the first mobile device to control, as host device, the host device or initial host device as a peripheral device.

29. The mobile device according to claim 28, wherein:
- the connection means are configured to connect to a third mobile device;
- the communication means are configured to communicate, if the first mobile device is acting as the initial host device, with the third mobile device to determine that the third mobile device is to act as an initial peripheral device;
- the control means are configured to provide on the display options to enable the user to input into the first mobile device instructions as to whether the third mobile device is to control any resources in either or both of the first and the second mobile devices;
- the control means are configured to receive instructions from the user in response to the options;
- the control means are configured to pass control to the third mobile device of resources in either or both of the first and second mobile devices that have been specified are to be controlled from the third mobile device.

30. The mobile device according to claim 28, wherein:
- the first mobile device is designated as restricted;
- the first mobile device is configured to send a signal to the host device or initial host device indicating that the first mobile device is restricted;
- the first mobile device is configured to communicate with the host device or initial host device to authenticate the first mobile device to enable the host device or initial host device to control the first mobile device as a peripheral device.

31. The mobile device according to claim 28, wherein:
- one or more resources of the first mobile device are designated as restricted;
- the first mobile device is configured to send a signal to the host device or initial host device indicating that one or more resources of the first mobile device are designated as restricted;
- the first mobile device is configured to communicate with the host device or initial host device to authenticate the restricted one or more resources of the first mobile device to enable the host device or initial host device to control the restricted one or more resources of the first mobile device.

32. The mobile device according to claim 28, wherein:
- the first mobile device is designating with a classification;
- the first mobile device is configured to send a signal to the host device or initial host device indicating its designated classification, wherein the classification comprises one or more of:
- Type of device (laptop, netbook, tablet, wearable, smartphone etc.)
- Manufacturer/Vendor
- Issuer
- Owner.

33. A system comprising at least two mobile devices wherein at least one of the at least two mobile devices comprises a mobile device according to claim 28.

* * * * *